United States Patent [19]

Ueyama et al.

[11] Patent Number: 4,707,395

[45] Date of Patent: Nov. 17, 1987

[54] HEAT-SENSITIVE TRANSFERRING RECORDING MEDIUM

[75] Inventors: Seiji Ueyama, Hirakata; Hiroyasu Onoe, Ikoma, both of Japan

[73] Assignee: General Company Limited, Osaka, Japan

[21] Appl. No.: 760,032

[22] Filed: Jul. 29, 1985

[30] Foreign Application Priority Data

Mar. 12, 1985 [JP] Japan .................................. 60-47442

[51] Int. Cl.[4] .................................................. B32B 7/02

[52] U.S. Cl. ...................................... 428/212; 106/31; 428/195; 428/207; 428/484; 428/488.1; 428/488.4; 428/913; 428/914

[58] Field of Search ............... 106/31; 428/484, 488.1, 428/488.4, 913, 914, 212, 195, 207, 212

[56] References Cited

U.S. PATENT DOCUMENTS

| | | | |
|---|---|---|---|
| 2,777,781 | 1/1957 | Kordig et al. | 428/488.4 |
| 3,418,148 | 12/1968 | Barz | 428/488.1 |
| 4,518,645 | 5/1985 | Moriguchi et al. | 428/488.4 |

FOREIGN PATENT DOCUMENTS

| | | | |
|---|---|---|---|
| 217392 | 12/1983 | Japan | 428/488.1 |
| 0073995 | 4/1984 | Japan | 428/488.4 |
| 114098 | 6/1984 | Japan | 428/488.4 |
| 0190898 | 10/1984 | Japan | 428/488.4 |

*Primary Examiner*—John E. Kittle
*Assistant Examiner*—P. R. Schwartz
*Attorney, Agent, or Firm*—Wegner & Bretschneider

[57] ABSTRACT

A heat-sensitive transferring recording medium comprises a substrate, a heat-sensitive releasing layer, a coloring agent layer and a heat-sensitive cohesive layer.

4 Claims, No Drawings

HEAT-SENSITIVE TRANSFERRING RECORDING MEDIUM

BACKGROUND OF THE INVENTION

1. Field of the Invention

This invention relates to a heat-sensitive transferring recording medium used for heat-sensitive transferring recording apparatuses such as thermal facsimile, thermal printer and the like.

2. Description of the Prior Art

Heat-sensitive recording system which is of nonimpact type has recently drawn attention since the system is free of noise and can be easily handled.

Indeed, conventional heat-sensitive recording systems are free of noise and neither development nor fixation of the images is necessary and, in addition, the handling is easy, but the resulting record is liable to be falsified and its durability is not so good.

For the purpose of solving these drawbacks, a particular heat-sensitive transferring recording method was proposed. That is, a heat melting ink layer is provided on a substrate, and said ink layer contacted with a receiving paper (recording paper) followed by heating with a thermal head through the substrate to melt said ink layer resulting in transferring of the heated portion to a receiving paper which is an ordinary paper.

The above-mentioned heat-sensitive transferring recording method can give good printed letters where the smoothness of the receiving paper which is an ordinary paper is high, but where the smoothness is low, for example, the Bekk smoothness test value is not higher than 50 sec., the heat melting ink layer contacts the receiving paper at some portions while said layer does not contact the receiving paper at other portions, because of the uneven surface of the receiving paper. This results in a low transferring efficiency, formation of void, and low sharpness. In addition, since the heat melting ink has a high fluidity, the ink penetrates into the inside of the receiving paper so that the density of the printed letters is low and good printed letters can not be obtained.

SUMMARY OF THE INVENTION

An object of the present invention is to provide a heat-sensitive transferring recording medium free of the above-mentioned drawbacks.

Another object of the present invention is to provide a heat-sensitive transferring recording medium of high transferring efficiency and capable of giving printed images free of void.

A further object of the present invention is to provide a heat-sensitive transferring recording medium giving printed images of high density.

According to the present invention, there is provided a heat-sensitive transferring recording medium which comprises a substrate, a heat-sensitive releasing layer overlying the substrate, a coloring agent layer overlying the heat-sensitive releasing layer, and a heat-sensitive cohesive layer overlying the coloring agent layer.

DESCRIPTION OF THE PREFERRED EMBODIMENTS

In order to obtain printed letters of high density and little void on a paper of low smoothness, it is necessary that the transferring efficiency is high, the transferring is effected in a form of block, i.e. the transferring is not effected in a form of point, but in a form of plane, and penetration of the ink into the paper is prevented.

The heat-sensitive transferring recording medium of the present invention can satisfy the above-mentioned conditions.

The substrate of heat-sensitive transferring recording medium may be composed of a plastic film provided with a heat resistant protective layer.

It is preferable that the heat-sensitive releasing layer is easily melted when heated and has a low melt viscosity. It is preferable that the coloring agent layer does not melt or has a high melt viscosity. Further it is preferable that the heat-sensitive cohesive layer becomes cohesive when heated and the value of the melt viscosity is between that of the heat-sensitive releasing layer and that of the coloring agent layer.

The heat-sensitive releasing layer comprises, for example, 50–100 parts by weight of wax, 0–30 parts by weight of resin and 0–50 parts by weight of coloring agent. The coloring agent layer comprises, for example, 0–30 parts by weight of wax, 20–50 parts by weight of resin and 40–80 parts by weight of pigment. The heat-sensitive cohesive layer comprises, for example, 0–50 parts by weight of wax, 50–80 parts by weight of resin, 0–50 parts by weight of pigment.

The thickness of the heat-sensitive releasing layer is preferably 1–4$\mu$, that of the coloring agent layer is preferably 1–8$\mu$ and that of the heat-sensitive cohesive layer is preferably 1–8$\mu$.

The heat-sensitive transferring recording medium has preferably the following constitution. That is, the heat-sensitive releasing layer is mainly composed of a easily melting wax having a low melt viscosity; the coloring agent layer is mainly composed of a pigment which hardly melts and has a weak film-shapability; and the heat-sensitive cohesive layer is mainly composed of a resin which becomes cohesive when heated by a thermal head; and these layers are successively formed on a substrate in the mentioned order.

The coloring agents contained in the heat-sensitive releasing layer may be dyes or coloring pigments. The pigments contained in the coloring agent layer and the heat-sensitive cohesive layer may be coloring pigments or extender pigments.

The substrate in the present invention includes a thin paper of, for example, less than 20$\mu$ thick, such as glassine paper, condenser paper and the like, and a heat resistant film of, for example, less than 10$\mu$ thick, such as polyester, polyimide, nylon, polypropylene and the like.

A plastic film of 2–10$\mu$ thick is preferable.

Waxes, resins and coloring agents which may be used in the present invention are exemplified in Table 1 below.

TABLE 1

| | |
|---|---|
| Wax | Paraffin wax |
| | Microcrystalline wax |
| | Carnauba wax |
| | Shellac wax |
| | Montan wax |
| | Higher fatty acids |
| | Higher fatty acid amides |
| | Higher alcohols |
| | Metallic soap |
| resin | Polyvinyl acetate |
| | Polyvinyl chloride |
| | Polyvinyl butyral |
| | Polyethylene |
| | Polyamide |
| | Hydroxyethylcellulose |

TABLE 1-continued

| | |
|---|---|
| | Methyl cellulose<br>Nitrocellulose<br>Polystyrene<br>Polyesters<br>Polyacrylate<br>Vinyl chloride-vinyl acetate copolymer<br>Ethylene-vinyl acetate copolymer<br>Ethylene-organic acid copolymer<br>Vinyl chloride-vinylidene chloride copolymer |
| Coloring agent and pigment | Coloring pigments such as carbon black, iron oxide, Prussian blue, titanium oxide, lake red, and the like;<br>Dyes such as basic dyes, neozapon dyes and the like;<br>Extender pigments such as calcium carbonate, clay, talc and the like |

As materials for the heat-resistant protective layer, there may be mentioned higher fatty acids, fluorocarbon polymers, and silicone resins.

The heat-sensitive transferring recording medium can be produced, for example, by the following proce- dure.

A coating composition for a heat-sensitive releasing layer, a coating composition for a coloring agent layer, and a coating composition for a heat-sensitive cohesive layer are dispersedly mixed by heated ball mills or attritors, or are dispersed in solvents or water, and then they are successively applied to a substrate by a hot melt coater, a solvent coater or an aqueous coater.

When a heat resistant protective layer is formed in a substrate, the above-mentioned material for the heat resistant protective layer may be dispersed in and mixed with a solvent and, before the heat-sensitive releasing layer, coloring agent layer and heat-sensitive cohesive layer are formed, the resulting coating material is applied by a solvent coater to a surface of the substrate opposite to the surface to which the above-mentioned layers are to be formed.

In the present invention, on the substrate there are formed a layer for facilitating to release an ink layer (i.e. heat-sensitive releasing layer), a layer which substantially does not have fluidity (i.e. coloring agent layer), and a layer which is cohesive and can adhere to a receiving paper (i.e. heat-sensitive cohesive layer). Such three-layered heat-sensitive transferring recording medium acts in such a manner that the ink layer (a coloring agent layer and a heat-sensitive cohesive layer) is released from the substrate by heating with a thermal head and the cohesion of the heat-sensitive cohesive layer enables to completely transfer the ink layer to a receiving paper. Thus, printed images of high transferring efficiency and free of void can be produced.

In addition, the medium has a layer substantially incapable of becoming fluidized by heating (the coloring agent layer) and thereby, printed images of high density can be produced.

The following examples are given for illustrating the present invention more in detail.

REFERENCE EXAMPLE

| | |
|---|---|
| Paraffin wax | 40 parts |
| Carnauba wax | 30 parts |
| Ethylene-vinyl acetate (90:10) Copolymer | 10 parts |
| Carbon Black | 20 parts |

An ink composed of the above-mentioned components was applied to a polyester film of 6μ thick in the thickness of 4μ by a hot melt coating method.

EXAMPLE 1

To a polyester film of 6μ thick were successively applied the following layers.

Heat-sensitive releasing layer:

Paraffin wax was applied in the thickness of 1μ by hot melt coating.

Coloring agent layer:

| | |
|---|---|
| Ethylene-vinylacetate (90:10) Copolymer | 40 parts by weight |
| Carbon black | 30 parts by weight |
| Calcium carbonate light | 30 parts by weight |
| Toluene | 200 parts by weight |

The above-mentioned components were applied by solvent coating and dried. Thickness was 2μ.

Heat-sensitive cohesive layer:

| | |
|---|---|
| Ethylene-vinylacetate (90:10) Copolymer | 60 parts by weight |
| Carnauba wax | 20 parts by weight |
| Carbon black | 20 parts by weight |
| Ethyl acetate | 100 parts by weight |
| Toluene | 200 parts by weight |

The above-mentioned components were applied by solvent coating and dried. Thickness was 2μ.

EXAMPLE 2

To a polyester film of 6μ thick were successively applied the following layers.

Heat-sensitive releasing layer:

| | |
|---|---|
| Paraffin wax | 80 parts by weight |
| Calcium carbonate | 20 parts by weight |

The above-mentioned components were applied by hot melt coating in the thickness of 2μ.

Coloring agent layer:

| | Component (parts by weight) | Solid matter (%) |
|---|---|---|
| Ethylene-vinyl acetate (90:10) copolymer emulsion (solid matter 45%) | 50 | 30.6 |
| Zinc stearate dispersion (solid matter 30%) | 50 | 20.4 |
| Carbon black dispersion (solid matter 30%) | 120 | 49.0 |

The above-mentioned components were applied by solvent coating in the thickness of 2μ.

Heat-sensitive cohesive layer:

| | Component (parts by weight) | Solid matter (%) |
|---|---|---|
| Ethylene-vinyl acetate (90:10) copolymer emulsion (solid matter 45%) | 100 | 71.4 |
| Carnauba emulsion (solid matter 30%) | 30 | 14.3 |
| Carbon black dispersion | 30 | 14.3 |

-continued

| | Component (parts by weight) | Solid matter (%) |
|---|---|---|
| (solid matter 30%) | | |

The above-mentioned components were applied by solvent coating and dried. The thickness was 2μ.

TEST METHOD

The heat-sensitive transferring recording mediums were tested by means of a heat-sensitive printer (cycle, 1.2 msec.; applied pulse width, 0.9 msec.; power, 0.5 W/dot) with a receiving paper (Bekk test, 16 sec.; Hammer Mill Bond paper) (JIS P8119).

The heat-sensitive transferring recording medium prepared in Reference Example gave many voids and low density while that prepared in each of Examples 1 and 2 gave good printed letters of few voids and high density.

What is claimed is:

1. A heat-sensitive transferring recording medium which comprises a substrate, a heat-sensitive releasing layer overlying the substrate, a coloring agent layer overlying the heat-sensitive releasing layer, and a heat-sensitive cohesive layer overlying the coloring agent layer, wherein the heat-sensitive releasing layer is easily melted when heated and has a low melt viscosity, the coloring agent layer does not melt or has a high melt viscosity, and the heat-sensitive cohesive layer becomes cohesive when heated and has a melt viscosity the value of which is between that of the heat-sensitive releasing layer and that of the coloring agent layer.

2. A heat-sensitive transferring recording medium according to claim 1 in which the substrate is composed of a plastic film provided with a heat resistant protective layer.

3. A heat-sensitive transferring recording medium according to claim 2 in which the heat-sensitive releasing layer comprises wax:resin:coloring agent=50-100-:0-30:0-50 (parts by weight), the coloring agent layer comprises wax:resin:pigment=0-30: 20-50:40-80 (parts by weight), and the heat-sensitive cohesive layer comprises wax:resin:pigment=0-50:50-80:0-50 (parts by weight).

4. A heat-sensitive transferring recording medium according to claim 1 in which the heat-sensitive releasing layer comprises wax:resin:coloring agent=50-100-:0-30:0-50 (parts by weight), the coloring agent layer comprises wax:resin:pigment=0-30: 20-50:40-80 (parts by weight), and the heat-sensitive cohesive layer comprises wax:resin:pigment=0-50:50-80:0-50 (parts by weight).

* * * * *